United States Patent
Lee et al.

(10) Patent No.: US 11,836,486 B2
(45) Date of Patent: Dec. 5, 2023

(54) METHOD FOR IDENTIFYING OPEN-SOURCE SOFTWARE COMPONENTS AT THE SOURCE-CODE LEVEL

(71) Applicant: Korea University Research and Business Foundation, Seoul (KR)

(72) Inventors: Heejo Lee, Seongnam-si (KR); Seunghoon Woo, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 105 days.

(21) Appl. No.: 17/525,126

(22) Filed: Nov. 12, 2021

(65) Prior Publication Data
US 2022/0236984 A1    Jul. 28, 2022

(30) Foreign Application Priority Data
Jan. 26, 2021    (KR) .......................... 10-2021-0010585

(51) Int. Cl.
G06F 8/75    (2018.01)

(52) U.S. Cl.
CPC .................................. G06F 8/751 (2013.01)

(58) Field of Classification Search
USPC ........................................................ 717/120
See application file for complete search history.

(56) References Cited

U.S. PATENT DOCUMENTS

| | | | |
|---|---|---|---|
| 8,255,885 B2 | 8/2012 | Zeidman | |
| 9,110,769 B2* | 8/2015 | Zhang | G06F 8/751 |
| 9,946,880 B2 | 4/2018 | Lee et al. | |
| 10,146,532 B2* | 12/2018 | Lee | G06F 8/751 |
| 10,564,961 B1* | 2/2020 | Braun | H04L 67/10 |
| 2016/0202972 A1* | 7/2016 | Sass | G06F 21/10 717/121 |
| 2017/0249143 A1* | 8/2017 | Sass | G06F 8/36 |
| 2017/0308380 A1 | 10/2017 | Lee et al. | |
| 2019/0102165 A1* | 4/2019 | Kim | G06F 21/10 |
| 2020/0065074 A1* | 2/2020 | Duan | G06F 16/282 |
| 2020/0142692 A1* | 5/2020 | Abadi | G06F 16/903 |

(Continued)

FOREIGN PATENT DOCUMENTS

| | | |
|---|---|---|
| KR | 10-1568224 B1 | 11/2015 |
| KR | 10-1780233 B1 | 9/2017 |

(Continued)

OTHER PUBLICATIONS

Roy, C. K., Cordy, J. R., & Koschke, R. (2009). Comparison and evaluation of code clone detection techniques and tools: A qualitative approach. Science of computer programming, 74(7), 470-495. (Year: 2009).*

(Continued)

*Primary Examiner* — Jason D Mitchell
(74) *Attorney, Agent, or Firm* — NSIP Law

(57) ABSTRACT

According to some exemplary embodiments of the present disclosure, a method for identifying open source software (OSS) components using a processor of a computing device is disclosed. The method for identifying open source software (OSS) components may include: constructing a component database by performing redundancy elimination for each of a plurality of open source software; and identifying a component of target software by using the component database.

12 Claims, 10 Drawing Sheets

(56) References Cited

U.S. PATENT DOCUMENTS

2022/0237300 A1* 7/2022 Regev ................... G06F 16/245
2022/0300277 A1* 9/2022 Aldama ................ G06F 21/577

FOREIGN PATENT DOCUMENTS

KR          10-1780233 B1     9/2020
KR          10-2160544 B1     9/2020

OTHER PUBLICATIONS

Ishio, T., Kula, R. G., Kanda, T., German, D. M., & Inoue, K. (May 2016). Software ingredients: Detection of third-party component reuse in java software release. In Proceedings of the 13th International Conference on Mining Software Repositories (pp. 339-350). (Year: 2016).*

Kim, Seulbae, and Heejo Lee. "Software systems at risk: An empirical study of cloned vulnerabilities in practice." *computers & security* 77 (Feb. 27, 2018): pp. 720-736.

Cho, Hyeonwoong, SeulGi Kim, and Taekyoung Kwon. "Sanitization of open-source based deduplicated filesystem." *Journal of the Korea Institute of Information Security & Cryptology* 26.5 (Sep. 20, 2016): pp. 1141-1149.

Korean Office Action dated Apr. 30, 2022 in counterpart Korean Patent Application No. 10-2021-0010585 (4 pages in Korean).

* cited by examiner

Fig. 8

|  | OSSPolice | Present invention |
|---|---|---|
| Analysis level | Software binary | Software source code |
| Utilization granularity unit | Feature unit (e.g., character string, function name, etc.) | Function unit |
| Expandability | Prominent | High |
| Accuracy | Prominent (detecting modified component is impossible) | High (detecting modified component is possible) |
| Quantitative comparison | 1. Utilizing 2B LoC data set<br>2. Average feature extraction time per OSS of 1000 seconds<br>3. Detection time ≒ number of features of OSS<br>4. Call rate of 87%, precision of 82% (except for modified component) | 1. Utilizing 80B LoC data set (approximately 40 times)<br>2. Average function extraction time per OSS of 320 seconds<br>3. Detection time ≤ 100 seconds<br>4. Call rate of 94%, precision of 91% (considering modified component) |

(a) DejaVu (50%)
(many false positives and negatives)

(b) CENTRIS
(highly precise)

METHOD FOR IDENTIFYING OPEN-SOURCE SOFTWARE COMPONENTS AT THE SOURCE-CODE LEVEL

CROSS-REFERENCE TO RELATED APPLICATIONS

This application claims priority to and the benefit of Korean Patent Application No. 10-2021-0010585 filed in the Korean Intellectual Property Office on Jan. 26, 2021, the entire contents of which are incorporated herein by reference.

TECHNICAL FIELD

The present disclosure relates to detection of an open-source software component reused by specific software, and particularly, to a method for extensively and accurately detecting even a reuse pattern in addition to an open-source software list which is being reused.

BACKGROUND ART

Open source software (OSS) may mean software which can be reused, modified, and redistributed by anyone without a particular limit if a license is observed while a source code is opened. Developers may not implement detailed functions required for developing the software one by one, but shorten software development time and cost through reuse of an open source software code which is previously implemented.

In spite of such an advantage, reuse of indiscriminate unmanaged open source software may cause various problems. Representatively, a problem of propagating a weak point while vulnerable open source software is used and a license violation problem due to reuse of open source software which does not follow a license policy may occur.

When the open source software component which is being reused may be clearly detected, the problems may be prevented. However, the reuse of the modified open source software makes accurate component detection into a challenging problem. The developers frequently reuse only some source codes or modify and reuse a code and a structure in the process of reusing the open source software. If it is confirmed that there are some common source codes between target software and specific open source software, it is not easy to distinguish whether some open source software is actually reused (correct detection) or whether only a sub-component in the open source software is reused (in this case, determining that all open source software is reused is false detection).

The number of open source software and a code size of each open source software which increase steadily can make the detection of the open source software component within a reasonable time be more difficult.

Technology that detects the open source software component at a binary level, "Identifying Open-Source License Violation and 1-day Security Risk at Large Scale", was announced in ACM Conference on Computer and Communications Security (CCS) in 2017, but the corresponding technology does not sufficiently consider the modified open source software component and may be insufficient even in terms of expandability in detecting the open source software component in large-sized software.

Accordingly, a method is required, which is to detect the open source software component accurately and expansively while considering reuse of the modified open source software.

SUMMARY OF THE INVENTION

The present disclosure is contrived in response to the above-described background art, and has been made in an effort to provide a method for accurately detecting an open source software component list which is being used by specific software and a reuse pattern thereof from a large-scale open source software set.

However, technical objects of the present disclosure are not restricted to the technical object mentioned as above. Other unmentioned technical objects will be apparently appreciated by those skilled in the art by referencing to the following description.

In order to solve the problem, an exemplary embodiment of the present disclosure provides a method for identifying open source software (OSS) components using a processor of a computing device. The method for identifying open source software (OSS) components may include: constructing a component database by performing redundancy elimination for each of a plurality of open source software; and identifying a component of target software by using the component database.

The constructing of the component database by performing the redundancy elimination for each of the plurality of open source software may include when performing the redundancy elimination for first open source software among the plurality of open source software, recognizing at least one function which appears in each of at least one version of the first open source software, and setting a hash value of each of the at least one function as a key and setting at least one version in which each of the at least one function appears to a value for the key, and storing the key value in a first dictionary data structure for the first open source software.

The first dictionary data structure may be distinguished into different groups according to the number of versions in which the function appears.

The identifying of the component of the target software by using the component database may include segmenting a source code included in each of the plurality of open source software into an application code part and a borrowed code part, and comparing a target source code included in the target software and the application code part included in each of the plurality of open source software to extract at least one second open source software used when preparing the target software among the plurality of open source software.

The segmenting of the source code included in each of the plurality of open source software into the application code part and the borrowed code part may include recognizing one or more first functions which appear in a first source code included in third open source software to be subjected to the code segmentation among the plurality of open source software, selecting fourth open source software to be analyzed through a comparison with the third open source software among the plurality of open source software, recognizing one or more second functions which appear in a second source code included in the fourth open source software, comparing the one or more first functions and the one or more second functions and extracting one or more common functions recognized to be the same, recognizing one or more third functions which appear earlier in the fourth open source software among the one or more common functions, and removing the one or more third functions from a second dictionary data structure related to the third open source software in the component database.

The removing of the one or more third functions from the second dictionary data structure related to the third open source software in the component database may include, when a value calculated based on a first number of the one or more second functions and a second number of the one or more third functions is equal to or more than a predetermined value, removing the one or more third functions from the one or more first functions included in the second dictionary data structure.

The comparing of the target source code included in the target software and the application code part included in each of the plurality of open source software to extract at least one second open source software used when preparing the target software among the plurality of open source software may include recognizing each code similarity value between each of the plurality of open source software and the target software based on a third number of functions commonly included in the function included in the target source code and the function of the application code part of each of the plurality of open source software subjected to the code segmentation and a fourth number of functions of the application code part of each of the plurality of open source software subjected to the code segmentation, and extracting at least one second open source software in which the code similarity value is equal to or more than a predetermined value among the plurality of open source software subjected to the coding segmenting.

The code similarity value may be determined based on a first equation, the first equation may be $$\Phi = \frac{|T \cap S|}{|S|},$$

and the Φ may represent the code similarity value, the T may represent the function of the target software, and the S may represent the function of the application code part of the plurality of open source software subjected to the code segmentation.

Another exemplary embodiment of the present disclosure provides a device for identifying open source software components may include: a processor performing redundancy elimination for each of a plurality of open source software; and a component database unit storing a result of performing the redundancy elimination, in which the processor may identify a component of target software by using the component database unit.

The processor may recognize at least one function which appears in each of at least one version of the first open source software, and set a hash value of each of the at least one function as a key and set at least one version in which each of the at least one function appears to a value for the key, and store the key value in the component database unit as a first dictionary data structure for the first open source software when performing the redundancy elimination for first open source software among the plurality of open source software.

The first dictionary data structure may be distinguished into different groups according to the number of versions in which the function appears.

The processor may segment a source code included in each of the plurality of open source software into an application code part and a borrowed code part, and compares the target source code included in the target software and the application code part included in each of the plurality of open source software to extract at least one second open source software used when preparing the target software among the plurality of open source software.

The processor may recognize one or more first functions which appear in a first source code included in third open source software to be subjected to the code segmentation among the plurality of open source software, select fourth open source software to be analyzed through a comparison with the third open source software among the plurality of open source software, recognize one or more second functions which appear in a second source code included in the fourth open source software, compare the one or more first functions and the one or more second functions and extract one or more common functions recognized to be the same, recognize one or more third functions which appear earlier in the fourth open source software among the one or more common functions, and remove the one or more third functions from a second dictionary data structure related to the third open source software in the component database unit.

The processor may, when a value calculated based on a first number of the one or more second functions and a second number of the one or more third functions is equal to or more than a predetermined value, removes the one or more third functions from the one or more first functions included in the second dictionary data structure.

The processor may recognize each code similarity value between each of the plurality of open source software and the target software based on a third number of functions commonly included in the function included in the target source code and the function of the application code part of each of the plurality of open source software subjected to the code segmentation and a fourth number of functions of the application code part of each of the plurality of open source software subjected to the code segmentation, and extract at least one second open source software in which the code similarity value is equal to or more than a predetermined value among the plurality of open source software subjected to the code segmentation.

The code similarity value may be determined based on a first equation, the first equation may be $$\Phi = \frac{|T \cap S|}{|S|},$$

and the Φ may represent the code similarity value, the T may represent the function of the target software, and the S may represent the function of the application code part of the plurality of open source software subjected to the code segmentation.

Technical solving means which can be obtained in the present disclosure are not limited to the aforementioned solving means and other unmentioned solving means will be clearly understood by those skilled in the art from the following description.

According to some exemplary embodiments of the present disclosure, security enhancement of software and software code management including whether there is a weak point and whether a license is violated can be performed.

Effects which can be obtained in the present disclosure are not limited to the aforementioned effects and other unmentioned effects will be clearly understood by those skilled in the art from the following description.

BRIEF DESCRIPTION OF THE DRAWINGS

Various aspects are now described with reference to the drawings and like reference numerals are generally used to designate like elements. In the following exemplary embodiments, for the purpose of description, multiple specific detailed matters are presented to provide general understanding of one or more aspects. However, it will be apparent that the aspect(s) can be executed without the specific detailed matters. In other examples, known structures and apparatuses are illustrated in a block diagram form in order to facilitate description of the one or more aspects.

FIG. 8 is a diagram for comparing the present disclosure and related art according to some exemplary embodiments of the present disclosure.

DETAILED DESCRIPTION

Figure 1:
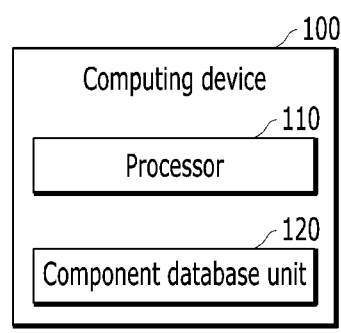
FIG. 1 is a block diagram for describing an example of a computing device according to some exemplary embodiments of the present disclosure.

Various exemplary embodiments and/or aspects will be now disclosed with reference to drawings. In the following description, for the purpose of a description, multiple detailed matters will be disclosed in order to help comprehensive appreciation of one or more aspects. However, those skilled in the art of the present disclosure will recognize that the aspect(s) can be executed without the detailed matters. In the following disclosure and the accompanying drawings, specific exemplary aspects of one or more aspects will be described in detail. However, the aspects are exemplary and some of various methods in principles of various aspects may be used and the descriptions are intended to include all of the aspects and equivalents thereof. Specifically, in "embodiment", "example", "aspect", "illustration", and the like used in the specification, it may not be construed that a predetermined aspect or design which is described is more excellent or advantageous than other aspects or designs.

Hereinafter, like reference numerals refer to like or similar elements regardless of reference numerals and a duplicated description thereof will be omitted. Further, in describing an embodiment disclosed in the present disclosure, a detailed description of related known technologies will be omitted if it is determined that the detailed description makes the gist of the embodiment of the present disclosure unclear. Further, the accompanying drawings are only for easily understanding the exemplary embodiment disclosed in this specification and the technical spirit disclosed by this specification is not limited by the accompanying drawings.

Although the terms "first", "second", and the like are used for describing various elements or components, these elements or components are not confined by these terms, of course. These terms are merely used for distinguishing one element or component from another element or component. Therefore, a first element or component to be mentioned below may be a second element or component in a technical spirit of the present disclosure.

Unless otherwise defined, all terms (including technical and scientific terms) used in the present specification may be used as the meaning which may be commonly understood by the person with ordinary skill in the art, to which the present disclosure pertains. Terms defined in commonly used dictionaries should not be interpreted in an idealized or excessive sense unless expressly and specifically defined.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

The word "comprises" and/or "comprising" means that the corresponding feature and/or component is present, but it should be appreciated that presence or addition of one or more other features, components, and/or a group thereof is not excluded. Further, when not separately specified or it is not clear in terms of the context that a singular form is indicated, it should be construed that the singular form generally means "one or more" in this specification and the claims.

The terms "information" and "data" used in the specification may also be often used to be exchanged with each other.

It should be understood that, when it is described that a component is "connected to" or "accesses" another component, the component may be directly connected to or access the other component or a third component may be present therebetween. In contrast, when it is described that a component is "directly connected to" or "directly accesses" another component, it is understood that no element is present between the element and another element.

Suffixes "module" and "unit" for components used in the following description are given or mixed in consideration of easy preparation of the present disclosure only and do not have their own distinguished meanings or roles.

The objects and effects of the present disclosure, and technical constitutions of accomplishing these will become obvious with reference to exemplary embodiments to be described below in detail along with the accompanying drawings. In describing the present disclosure, a detailed description of known function or constitutions will be omitted if it is determined that it unnecessarily makes the gist of the present disclosure unclear. In addition, terms to be described below as terms which are defined in consideration of functions in the present disclosure may vary depending on the intention or a usual practice of a user or an operator.

However, the present disclosure is not limited to exemplary embodiments disclosed below but may be implemented in various different forms. However, the exemplary embodiments are provided to make the present disclosure be complete and completely announce the scope of the present disclosure to those skilled in the art to which the present disclosure belongs and the present disclosure is just defined by the scope of the claims. Accordingly, the terms need to be defined based on contents throughout this specification.

In the present disclosure, a processor of a computing device performs redundancy elimination for each of a plurality of open source software (OSS) to construct a component database. In addition, the processor may identify a component of target software to identify a component by using the constructed component database. Hereinafter, a method for identifying open source software components according to the present disclosure will be described.

FIG. 1 is a block diagram for describing an example of a computing device according to some exemplary embodiments of the present disclosure.

Referring to FIG. 1, the computing device 100 may include a processor 110 and a component database unit 120. However, components described above are not required in implementing the computing device 100, so the computing device 100 may have components more or less than components listed above.

The computing device 100 may include a predetermined type computer system or computer device such as a microprocessor, a main frame computer, a digital processor, a portable device, or a device controller, for example.

Meanwhile, the processor 110 may generally process an overall operation of the computing device 100. The processor 110 processes a signal, data, information, and the like input or output through the components of the computing device or drives the application program stored in the component database unit 120 to provide or process information or a function appropriate for the user.

As an example, the processor 110 may perform the redundancy elimination for each of the plurality of open source software. In addition, the processor 110 may store the component database constructed by performing the redundancy elimination in the component database unit 120. Here, the redundancy elimination may be eliminating redundancy of functions commonly included in the plurality of open source software. In addition, the processor 110 may identify the component of target software by using the constructed component database. Here, the target software may be open source software to identify the component. Hereinafter, contents regarding an operation performed by the processor 110 according to the present disclosure will be described through FIGS. 2 to 8.

Meanwhile, the component database unit 120 may include a memory and/or a persistent storage. The memory may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. However, the present disclosure is not limited thereto.

Figure 2:
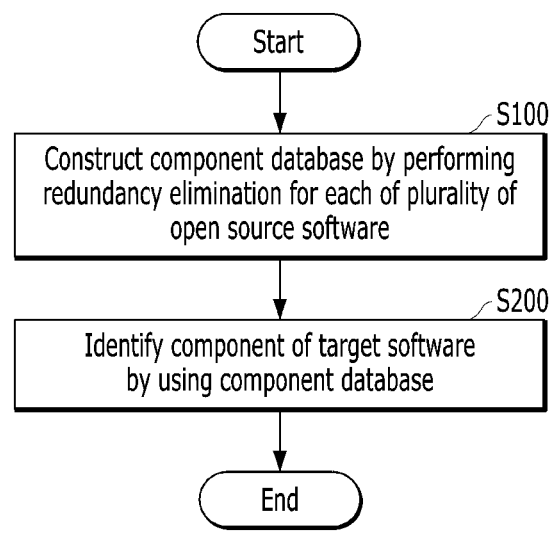
FIG. 2 is a flowchart for describing an example of a method for identifying a component of open source software by a computing device according to some exemplary embodiments of the present disclosure.

FIG. 2 is a flowchart for describing an example of a method for identifying a component of open source software by a computing device according to some exemplary embodiments of the present disclosure.

Referring to FIG. 2, the processor 110 of the computing device 100 may construct a component database by performing redundancy elimination for each of a plurality of open source software (S100).

As an example, at least one open source software of the plurality of open source software stored in the component database unit 120 may exist in plural for each version. In this case, when the version of the open source software is updated, a source code may not be newly prepared every time. Accordingly, a common code part may exist in each version of the open source software. The common code parts may be duplicated and used for matching when the processor 110 detects the component of the open source software. In this case, in the operation of the processor 110 which detects the component, a problem in that a detection operation requires a long time may occur or an error may occur. Accordingly, the processor 110 may perform the redundancy elimination for each of the plurality of open source software.

Specifically, when the processor 110 performs the redundancy elimination for first open source software among the plurality of open source software, the processor 110 may recognize at least one function which appears in one or more versions of the first open source software. In addition, the processor may generate a first dictionary data structure for the first open source software based on the at least one function and the version in which the at least one function appears. Here, the dictionary data structure may be a data structure which may store a value of a Key-Value type. In this case, the first dictionary data structure may be distinguished into different groups according to the number of versions in which the function appears. In this case, one or more functions which appear in one or more versions, respectively may be stored as one dictionary data structure. However, the present disclosure is not limited thereto. Hereinafter, the method in which the processor 110 performs the redundancy elimination according to the present disclosure will be described through FIGS. 3 and 4.

Meanwhile, the processor 110 of the computing device 100 may identify the component of the target software by using the component database (S200).

Specifically, the processor 110 may recognize at least one open source software having a code similarity value to the target software, which is equal to or more than a predetermined value among the plurality of open source software stored in the component database unit 120. Here, the code similarity value may be a value determined based on the number of functions commonly included in a function included in a target source code and a function of an application code part of each of the plurality of open source software, and the number of functions of the application code part included in each of the plurality of open source software. As an example, the processor 110 may determine at least one open source software of which code similarity is 10% or more as the component of the target software. Hereinafter, contents regarding the code similarity value according to the present disclosure will be described in more detail through FIG. 7.

Figure 3:
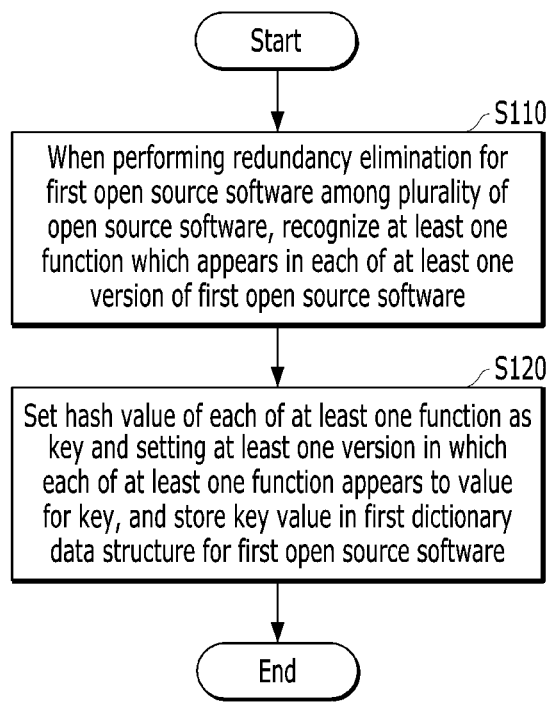
FIG. 3 is a flowchart for describing an example of a method for constructing a component database by a computing device according to some exemplary embodiments of the present disclosure.
Figure 4:
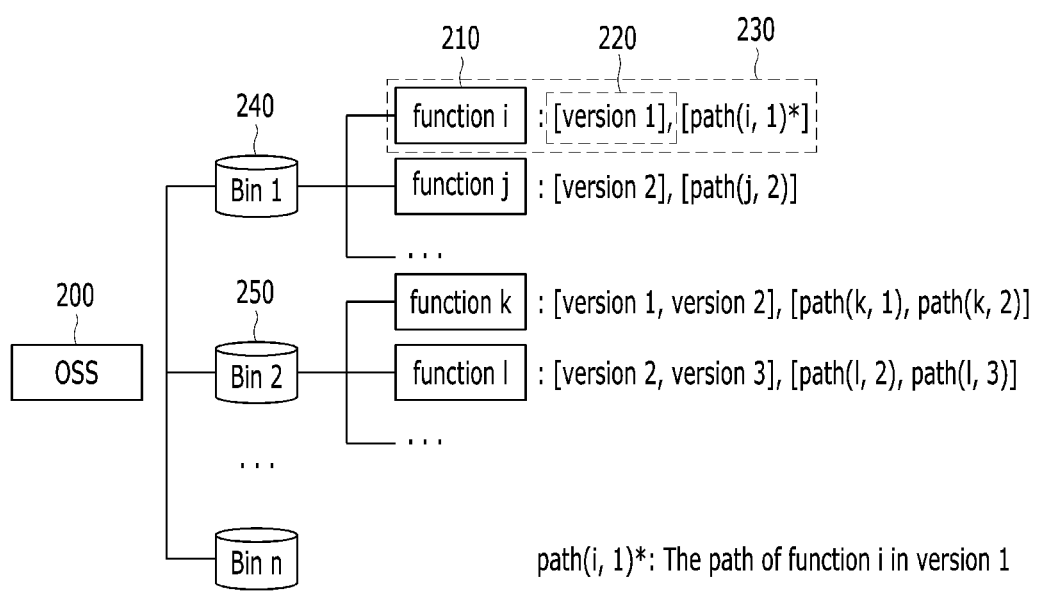
FIG. 4 is a diagram for describing a dictionary data structure according to some exemplary embodiments of the present disclosure.

FIG. 3 is a flowchart for describing an example of a method for constructing a component database by a computing device according to some exemplary embodiments of the present disclosure. FIG. 4 is a diagram for describing a dictionary data structure according to some exemplary embodiments of the present disclosure.

Referring to FIG. 3, the processor 110 of the computing device 100 may perform the redundancy elimination for the first open source software among the plurality of open source software. In this case, the processor 110 may recognize at least one function which appears in each of at least one version of the first open source software (S110).

Specifically, the processor 110 may set a hash value of each of at least one function as a key, and set one or more versions in which one or more functions appear, respectively to the value for the key. In addition, the processor 110 may store the hash value and the one or more versions in the first dictionary data structure for the first open source software (S120).

For example, referring to FIG. 4, the processor 110 may set a hash value 210 of an i function which appears in the first open source software 200 as the key. Further, the processor 110 may set one or more versions 220 in which the i function appears to the value. In this case, the hash value 210 of the i function and one or more versions 220 in which the i function appears may be stored in the first dictionary data structure 230. However, the present disclosure is not limited thereto.

Meanwhile, according to some exemplary embodiments of the present disclosure, the first dictionary data structure 230 may be distinguished into different groups according to the number of versions in which the function appears.

As an example, referring to a first group 240, at least one dictionary data structure including a function which appears only in one version may be distinguished in the first group 240.

As another example, referring to a second group 250, at least one dictionary data structure including functions which appear in two versions may be distinguished in the second group 250.

That is, the processor 110 may distinguish each of at least one function included in the first open source software 200 into different groups according to the number of versions in which the function appears. Accordingly, the processor 110 may perform the redundancy elimination by constructing the component database so that at least one function included in multiple versions of the first open source software 200 appears only once. However, the present disclosure is not limited thereto.

Meanwhile, the processor 110 of the computing device 100 performs the above-described operation in each of all open source software stored in the component database unit 120 to construct the component database. However, the present disclosure is not limited thereto.

According to the above-described configuration, the redundancy elimination is performed for functions which appear commonly in each version of the open source software which may be distinguished as at least one dictionary data structure. Accordingly, when the processor 110 of the computing device 100 identifies the component of the target software, a time required for computation may be reduced and occurrence of the error may also be reduced. Further, since more open source software may be collected through the redundancy elimination, an excellent database may be constructed in expandability and performance.

Meanwhile, according to some exemplary embodiments of the present disclosure, the processor 110 of the computing device 100 may identify the component of the target software by using the constructed component database. Hereinafter, an example of the method in which the processor 110 identifies the component of the target software according to the present disclosure will be described.

Figure 5:
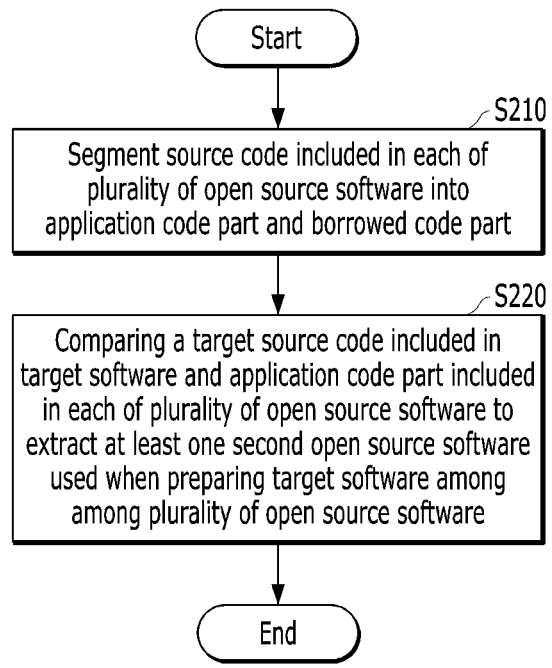
FIG. 5 is a flowchart for describing an example of a method for identifying a component of target software by a computing device according to some exemplary embodiments of the present disclosure.

FIG. 5 is a flowchart for describing an example of a method for identifying a component of target software by a computing device according to some exemplary embodiments of the present disclosure.

Referring to FIG. 5, the processor 110 of the computing device 100 may segment a source code included in each of the plurality of open source software into an application code part and a borrowed code part (S210). Here, the application code part may be a code recognized not to be prepared in another open source software. In addition, the borrowed code part may be a code recognized as a code first prepared in another open source software.

Specifically, the processor 110 may select open source software of which code segmentation is to be performed among the plurality of open source software and open source software which is to be analyzed through a comparison with the open source software. In addition, the processor 110 may recognize one or more functions which appear commonly in the open source software of which code segmentation is to be performed and the open source software to be compared and analyzed. In this case, the processor 110 may recognize that the one or more functions appear earlier in the open source software to be compared and analyzed. In this case, the processor 110 may recognize the one or more functions as the borrowed code part in the open source software of which code segmentation is to be performed. In this case, when the processor 110 recognizes that the one or more functions appear late in the open source software to be compared and analyzed, the processor 110 may recognize the one or more functions as the application code part in the open source software of which code segmentation is to be performed. Hereinafter, the method for performing the code segmentation according to the present disclosure will be described in more detail through FIG. 6.

Meanwhile, the processor 110 of the computing device 100 may compare the target source code included in the target software and the application code part included in each of the plurality of open source software. In addition, the processor 110 may extract at least one second open source software used when preparing the target software among the plurality of open source software (S220).

Specifically, the processor 110 compares the target source code included in the target software and the application code part included in each of the plurality of open source software to recognize the code similarity value. In addition, the processor 110 may extract at least one second open source software in which the code similarity value is equal to or more than a predetermined value. As an example, when the code similarity value between the target software and at least one second open source software is equal to or more than 10%, the processor 110 may extract at least one second open source software. However, the present disclosure is not limited thereto. Hereinafter, the method for extracting at least one second open source software according to the present disclosure will be described in more detail through FIG. 7.

According to the above-described configuration, the processor 110 of the computing device 100 may segment a source code included in each of the plurality of open source software into an application code part and a borrowed code part. In this case, the processor 110 may extract at least one second open source software used when preparing the target software by using only the application code part of the source code included in each of the plurality of open source software. Accordingly, a time required for the processor 110 to extract at least one second open source software may be reduced.

Meanwhile, according to some exemplary embodiments of the present disclosure, the processor 110 of the computing device 100 may remove a function recognized as the function included in the borrowed code part in performing the code segmentation in each of the plurality of open source software. Hereinafter, an example of the method in which the processor 110 according to the present disclosure performs the code segmentation will be described.

Figure 6:
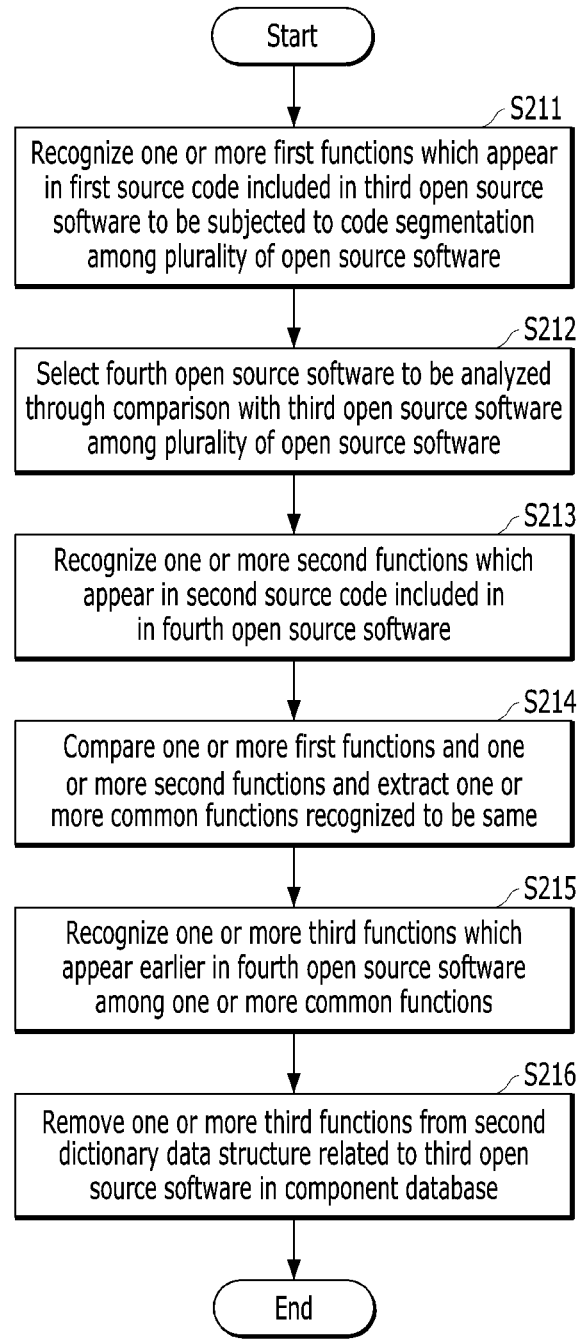
FIG. 6 is a flowchart for describing an example of a method for performing code segmentation by a computing device according to some exemplary embodiments of the present disclosure.

FIG. 6 is a flowchart for describing an example of a method for performing code segmentation by a computing device according to some exemplary embodiments of the present disclosure.

Referring to FIG. 6, the processor 110 of the computing device 100 may recognize one or more first functions which appear in a first source code included in third open source software of which code segmentation is to be performed among the plurality of open source software (S211). Here, the third open source software may be open source software which is subjected to the redundancy elimination and stored in the component database unit 120.

Meanwhile, the processor 110 of the computing device 100 may select fourth open source software to be compared and analyzed with the third open source software among the plurality of open source software (S212). Here, the fourth open source software may be at least one open source software which is subjected to the redundancy elimination and stored in the component database unit 120.

Meanwhile, the processor 110 of the computing device 100 may recognize one or more second functions which appear in the second source code included in the fourth open source software (S213).

Meanwhile, the processor 110 of the computing device 100 may extract one or more common functions recognized to be the same by comparing one or more first functions and one or more second functions (S214).

Meanwhile, the processor 110 of the computing device 100 may recognize one or more third functions which appear earlier in the fourth open source software among one or more common functions (S215).

Specifically, release information of each of the plurality of open source software may be stored in the component database unit 120. Here, the release information may be information on a date at which the open source software is distributed. Accordingly, the processor 110 may recognize which open source software of the third open source software and the fourth open source software is distributed earlier. In addition, when the processor 110 recognizes that the fourth open source software is earlier distributed, the processor 110 may recognize one or more third functions included in the fourth open source software among one or more common functions. However, the present disclosure is not limited thereto.

Meanwhile, the processor 110 of the computing device 100 may remove one or more third functions from a second dictionary data structure related to the third open source software in the component database (S216).

In this case, only the application code part of the third open source software may remain in the second dictionary data structure related to the third open source software. However, the present disclosure is not limited thereto.

Meanwhile, according to some exemplary embodiments of the present disclosure, the processor 110 of the computing device 100 may recognize a first number of one or more second functions and a second number of one or more third functions. In addition, when a value calculated based on the first number and the second number is equal to or more than a predetermined value, the processor 110 may remove the one or more third functions from one or more first functions included in the second dictionary data structure.

Specifically, the processor 110 may divide the first number of one or more second functions by the second number of one or more third functions. In addition, when the processor recognized that a value acquired by dividing the first number by the second number is equal to or more than 0.1, the processor may recognize that the second function is included in the borrowed part of the third open source software to be subjected to the code segmentation. The reason is that if 10% or more of a code base of the third open source software is included in the fourth open source software, it may be determined that there is a reusing possibility. In this case, the processor may remove the third function from one or more first functions which appear in the first source code included in the third open source software. However, the present disclosure is not limited thereto.

According to the above-described configuration, only the application code part of the third open source software may remain in the second dictionary data structure related to the third open source software in the component database unit 120. Accordingly, when the processor 110 of the computing device 100 identifies the component of the target software, a time required for computation may be reduced and occurrence of the error may also be reduced.

Meanwhile, according to some exemplary embodiments of the present disclosure, the processor 110 of the computing device 100 may extract at least one second open source software by using the code similarity value. Hereinafter, an example of a method in which the processor 110 according to the present disclosure extracts at least one second open source software by using the code similarity value will be described.

Figure 7:
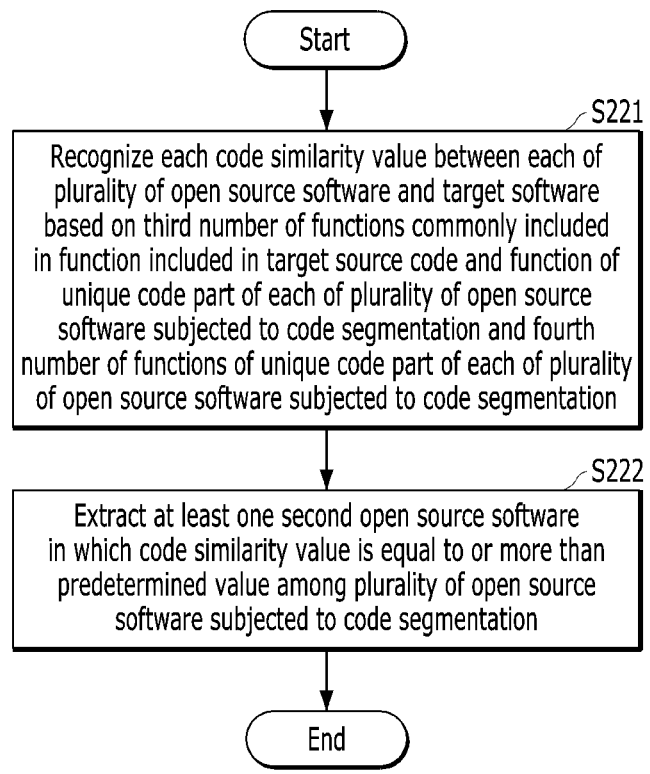
FIG. 7 is a flowchart for describing an example of a method for extracting at least one second open source software by using a code similarity value by a computing device according to some exemplary embodiments of the present disclosure.

FIG. 7 is a flowchart for describing an example of a method for extracting at least one second open source software by using a code similarity value by a computing device according to some exemplary embodiments of the present disclosure.

Referring to FIG. 7, the processor 110 of the computing device 100 may recognize a third number of functions commonly included in the functions included in the target source code and the functions of the application code part of each of the plurality of open source software subjected to the code segmentation. In addition, the processor 110 may recognize a fourth number of functions of the application code part of each of the plurality of open source software subjected to the code segmentation. In this case, the processor 110 may recognize each code similarity value between each of the plurality of open source software subjected to the code segmentation and the target software based on the third number and the fourth number (S221).

Here, the code similarity value may be defined as an equation below.

$$\Phi = \frac{|T \cap S|}{|S|} \qquad \text{[Equation 1]}$$

Here, $\Phi$ may represent the code similarity value. In addition, T may represent the function of the target software. Further, S may represent the function of the application code part of the plurality of open source software subjected to the code segmentation.

Specifically, the processor 110 may recognize a value acquired by dividing the third number by the fourth number as the code similarity value. However, the present disclosure is not limited thereto.

Meanwhile, the processor 110 of the computing device 100 may extract at least one second open source software in which the code similarity value is equal to or more than a predetermined value among the plurality of open source software subjected to the code segmentation (S222). Here, the predetermined value may be 10%. However, the present disclosure is not limited thereto. In addition, the processor 110 may determine the extracted second open source software as the component of target software. However, the present disclosure is not limited thereto.

FIG. 8 is a diagram for comparing the present disclosure and related art according to some exemplary embodiments of the present disclosure.

As representative conventional technology related to the present disclosure, there may be "Identifying Open-Source License Violation and 1-day Security Risk at Large Scale." (OSSPolice) technology by Ruian Duan and 4 persons.

Referring to FIG. 8, at an analysis level, the OSSPolice in the related art may perform an analysis at a software binary level. On the contrary, in the present disclosure, the analysis may be performed at a software source code level.

Meanwhile, in a utilization granularity unit, the OSSPolice in the related art may utilize a feature unit (e.g., a character string or a function name). However, when open source software component detection is performed by the feature units, modified reuse of a feature may not be considered. For example, the corresponding feature may not be used (partially reused) or source files in the open source software may also be reused at different locations from the source files in the existing open source software. In this case, accuracy may deteriorate. On the contrary, in the present disclosure, all functions in the source code other than some features may be limited to a basic unit. Accordingly, even though only a part of the source codes are reused, detection considering only the corresponding part may be possible. Further, since structural information (e.g., a path of a file) of the source code is not utilized in a detection process, it may be possible to detect the component regardless of whether the structure is changed.

Meanwhile, for comparison of expandability, in the case of the OSSPolice, an open source software set of 30 GB (a total of approximately 2 billion lines considering only C and C++ software) is selected as a data set. In this case, 1000 seconds are required on average for extracting the feature from each software through the OSSPolice, and a detection time (e.g., when the number of features is 10000, an average detection time also requires approximately 10000 seconds) which is in proportion to the number of features may be required on average. On the contrary, in the case of the present disclosure, an open source software set of 13 TB (a total of approximately 80 billion lines) is selected as an initial data set to be expanded by approximately 40 times as compared with the related art. Further, 320 seconds may be required per software on average in extracting the function and performing a preprocessing process, and when the component of the open source software is detected in the target software, average 100 seconds or less may be required. Accordingly, when it is evaluated that the expandability of the OSSPolice is prominent, it may be evaluated that the expandability of the present disclosure is high.

Meanwhile, as a result of comparing the accuracy through the above-described test, in the case of the OSSPolice, C/C++ OSS component detection accuracy except for a case where the structure is modified may be 82%. On the contrary, in the case of the present disclosure, component detection accuracy of 91% or more may be achieved in spite of considering both the modifications of the code and the structure. Accordingly, when it is evaluated that the accuracy of the OSSPolice is prominent, it may be evaluated that the expandability of the present disclosure is high.

Meanwhile, a recall rate may be compared through the above-described test. Here, the recall rate may mean a value for representing a ratio of open source software which is not found even though the component of the target software is correct. That is, high recall rate may indicate that the ratio of the open source software which is not found is low. In the case of the OSSPolice, as the recall rate, a result at a level of 87% may be derived. On the contrary, in the present disclosure, a result of 94% may be derived.

As a test result by comparing the OSSPolice which is the representative technology in the related art and the present disclosure as described above, in the present disclosure, the component of the open source software may be detected effectively as compared with the technology in the related art.

Meanwhile, as another technology in the related art, Dejavu code clone detection technology may exist. Table 1 below may show a result of component detection using the present disclosure (CENTRIS) and Dejavu.

TABLE 1

| | CENTRIS (with cs) | | | CENTRIS (without cs) | | | DéjàVu (classified by the threshold) | | | | | | | | |
|---|---|---|---|---|---|---|---|---|---|---|---|---|---|---|---|
| | | | | | | | 50% | | | 80% | | | 100% | | |
| Software | #T | #FP | #FN | #T | #FP | #FN | #T | #FP | #FN | #T | #FP | #FN | #T | #FP | #FN |
| ArangoDB | 29 | 2 | 0 | 29 | 450 | 0 | 11 | 411 | 18 | 8 | 236 | 21 | 7 | 0 | 22 |
| Crown | 23 | 0 | 0 | 23 | 750 | 0 | 9 | 171 | 14 | 6 | 23 | 17 | 3 | 0 | 20 |
| Cocos2dx | 19 | 2 | 0 | 19 | 231 | 0 | 8 | 52 | 11 | 2 | 6 | 17 | 1 | 0 | 18 |
| Splayer | 16 | 1 | 0 | 16 | 275 | 0 | 7 | 236 | 9 | 6 | 27 | 10 | 3 | 0 | 13 |
| Total | 87 | 5 | 0 | 87 | 1,706 | 0 | 35 | 870 | 52 | 22 | 292 | 65 | 14 | 0 | 73 |
| Precision | | 0.95 | | | 0.05 | | | 0.04 | | | 0.07 | | | 1.0 | |
| Recall | | 1.0 | | | 1.0 | | | 0.40 | | | 0.25 | | | 0.16 | | cs: code segmentation; #T: the number of true positives; #FP: the number of false positives; #FN: the number of false negatives.

Specifically, Table 1 may show an open source software component identification result between the present disclosure and Dejavu for 4 software projects (ArangoDB, Crown, Cocos2dx-classical, and Splayer). Referring to Table 1, in the case of Dejavu, a modified component which may not be identified may be shown. As an example, in the case of Dejavu, when a reused code ratio is lower than a selected threshold, the component may not be identified. Accordingly, in the case of Dejavu, a low recall rate of up to 40% may be shown. In addition, Dejavu aims at detecting a project level clone, but a mechanism of Dejavu may not include a processing routine of false positives due to overlapped open source software. Thereafter, when the threshold is selected as 50%, Dejavu may show precision of 4% and when the threshold is selected as 80%, Dejavu may show precision of 7%. When the threshold of Dejavu is selected 100%, precision of 100% is shown, but as it can be seen that the recall rate is 16%, a partially reused component may not be identified.

On the contrary, referring to a test result of the present disclosure (CENTRIS), precision of 95% and a recall rate of 100% may be shown when the code segmentation is applied (with cs). On the contrary, when the code segmentation is not performed (without cs), in the present disclosure, the false positives may not be processed with the same reason as Dejavu and precision of 5% may be shown. This may mean that the operation of the processor 110 of the computing device 100 performing step S210 which segments the source code into the application code part and the borrowed code part successfully detects numerous false positives. Last, the open source software component which is identified only in Dejavu and not identified in the present disclosure may not be shown among 4 software projects. In summary, the present disclosure may show even higher precision and recall rate than Dejavu.

Figure 9:
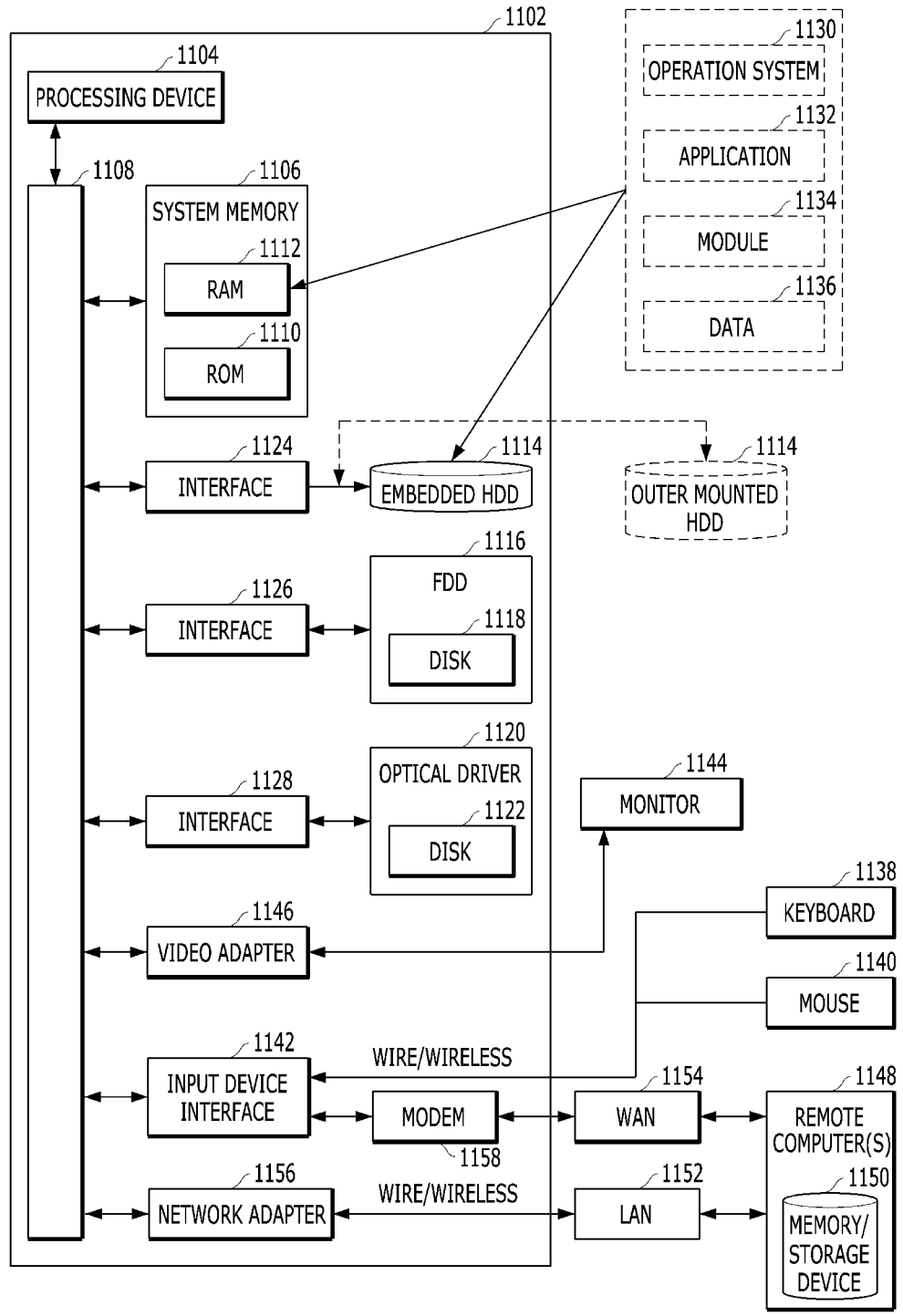
FIG. 9 is a general schematic view of an exemplary computing environment in which exemplary embodiments of the present disclosure may be implemented.

FIG. 9 is a general schematic view of an exemplary computing environment in which exemplary embodiments of the present disclosure may be implemented.

The present disclosure has generally been described above in association with a computer executable command which may be executed on one or more computers, but it will be well appreciated by those skilled in the art that the present disclosure can be implemented through a combination with other program modules and/or as a combination of hardware and software.

In general, the module in the present specification includes a routine, a procedure, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. The computer includes, as a computer accessible medium, volatile and non-volatile media, transitory and non-transitory media, and mobile and non-mobile media. As a non-limiting example, the computer readable media may include both computer readable storage media and computer readable transmission media.

The computer readable storage media include volatile and non-volatile media, transitory and non-transitory media, and mobile and non-mobile media implemented by a predetermined method or technology for storing information such as a computer readable instruction, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable instruction, the data structure, the program module, or other data in a carrier wave or a modulated data signal such as other transport mechanism and include all information transfer media. The term "modulated data signal" means a signal acquired by setting or changing at least one of characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an internal hard disk drive (HDD) 1114 (for example, EIDE and SATA)—the internal hard disk drive 1114 may also be configured for an external purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD). The hard disk drive 1114, the magnetic disk drive 1116, and the optical disk drive 1120 may be connected to the system bus 1108 by a hard disk drive interface 1124, a magnetic disk drive interface 1126, and an optical disk drive interface 1128, respectively. An interface 1124 for implementing an external drive includes, for example, at least one of a universal serial bus (USB) and an IEEE 1394 interface technology or both of them.

The drives and the computer readable media associated therewith provide non-volatile storage of the data, the data structure, the computer executable instruction, and others. In the case of the computer 1102, the drives and the media correspond to storing of predetermined data in an appropriate digital format. In the description of the computer readable storage media, the mobile optical media such as the HDD, the mobile magnetic disk, and the CD or the DVD are mentioned, but it will be well appreciated by those skilled in the art that other types of storage media readable by the computer such as a zip drive, a magnetic cassette, a flash memory card, a cartridge, and others may also be used in an exemplary operating environment and further, the predetermined media may include computer executable instructions for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached in the RAM 1112. It will be well appreciated that the present disclosure may be implemented in operating systems which are commercially usable or a combination of the operating systems.

A user may input instructions and information in the computer 1102 through one or more wired/wireless input devices, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes other peripheral output devices (not illustrated) such as a speaker, a printer, others.

The computer 1102 may operate in a networked environment by using a logical connection to one or more remote computers including remote computer(s) 1148 through wired and/or wireless communication. The remote computer(s) 1148 may be a workstation, a server computer, a router, a personal computer, a portable computer, a microprocessor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158, is connected to a communication server on the WAN 1154, or has other means that configure communication through the WAN 1154 such as the Internet, etc. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11 (a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as "software"), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be interpreted that the implementation determination departs from the scope of the present disclosure.

Figure 10:
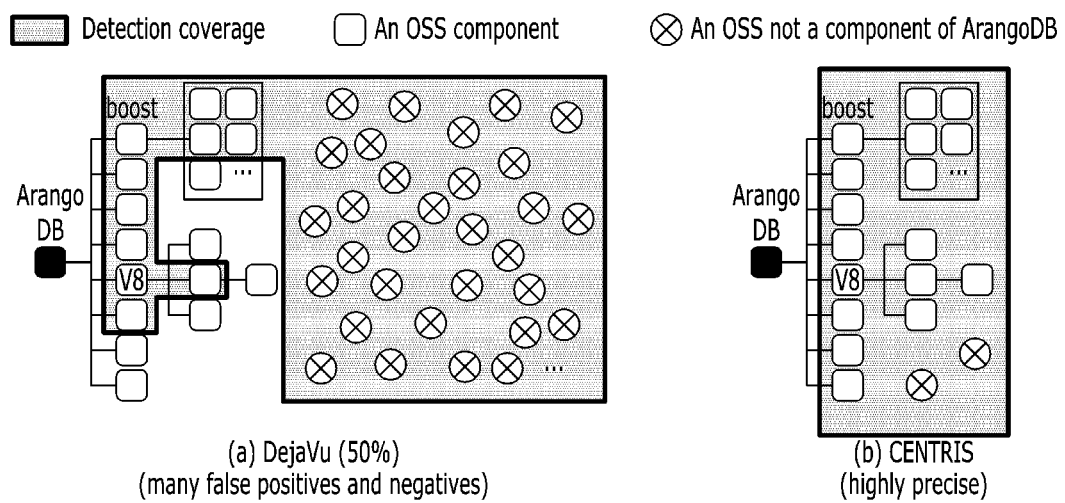
FIG. 10 is a diagram for comparing the present invention and related art according to some exemplary embodiments of the present disclosure.

Various exemplary embodiments presented herein may be implemented as manufactured articles using a method, a device, or a standard programming and/or engineering technique. The term "manufactured article" includes computer programs or media which are accessible by a predetermined computer-readable device. For example, a computer readable storage includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. The term "machine-readable media" includes a wireless channel and various other media that can store, possess, and/or transfer instruction(s) and/or data, but is not limited thereto.

FIG. 10 is a diagram for comparing the present invention and related art according to some exemplary embodiments of the present disclosure.

FIG. 10A may be a diagram for showing a detection result of open-source software components of ArangoDB using Dejavu which is the relate art. FIG. 10B may be a diagram for showing a detection result of open-source software components of ArangoDB using CENTRIS according to the present invention.

Referring to FIGS. 10A and 10B, it may be confirmed that in the detection result of the components using Dejavu, there are more false positives than in the detection result of the components using CENTRIS according to the present invention. Specifically, it may be confirmed that DejaVu detects more "An OSS not a component of ArangoDB" than CENTRIS according to the present invention.

Further, it may be confirmed that in the detection result of the components using Dejavu, there are more false negatives than in the detection result of the components using CENTRIS according to the present invention. Specifically, it may be confirmed that DejaVu cannot detect several "An OSS component of ArangoDB". Accordingly, it may be confirmed that the accuracy of the detection result of the components using CENTRIS according to the present invention is higher than the accuracy of the detection result of the components using DejaVu.

The description of the presented exemplary embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be interpreted within the widest range which is coherent with the principles and new features presented herein.

What is claimed is:

1. A method for identifying open source software (OSS) components using a processor of a computing device, the method comprising:
    performing redundancy elimination for each of a plurality of open source software;
    constructing a component database based on the plurality of open source software with the redundancy elimination; and
    identifying a component of target software by using the component database,
    wherein the identifying of the component of the target software by using the component database includes:
    segmenting a source code included in each of the plurality of open source software into an application code part and a borrowed code part, wherein the application code part includes a code recognized as not prepared in another open source software and the borrowed code part includes code recognized as a code first prepared in another open source software, and
    comparing a target source code included in the target software and the application code part included in each of the plurality of open source software to extract at least one second open source software used when preparing the target software among the plurality of open source software, and
    wherein the segmenting of the source code included in each of the plurality of open source software into the application code part and the borrowed code part includes:
    recognizing one or more first functions which appear in a first source code included in third open source software among the plurality of open source software to be subjected to code segmentation,
    selecting fourth open source software among the plurality of open source software to be analyzed through a comparison with the third open source software,
    recognizing one or more second functions which appear in a second source code included in the fourth open source software,
    comparing the one or more first functions and the one or more second functions, and extracting one or more common functions recognized to be the same,
    recognizing one or more third functions which appear earlier in the fourth open source software among the one or more common functions, and
    removing the one or more third functions from a second dictionary data structure related to the third open source software in the component database.

2. The method of claim 1, wherein the constructing of the component database by performing the redundancy elimination for each of the plurality of open source software includes
    when performing the redundancy elimination for first open source software among the plurality of open source software, recognizing at least one function which appears in each of at least one version of the first open source software, and
    setting a hash value of each of the at least one function as a key and setting at least one version in which each of the at least one function appears to a value for the key, and storing the key value in a first dictionary data structure for the first open source software.

3. The method of claim 2, wherein the first dictionary data structure is distinguished into different groups according to the number of versions in which the function appears.

4. The method of claim 1, wherein the removing of the one or more third functions from the second dictionary data structure related to the third open source software in the component database includes
    when a value calculated based on a first number of the one or more second functions and a second number of the one or more third functions is equal to or more than a predetermined value, removing the one or more third functions from the one or more first functions included in the second dictionary data structure.

5. The method of claim 1, wherein the comparing of the target source code included in the target software and the application code part included in each of the plurality of open source software to extract at least one second open source software used when preparing the target software among the plurality of open source software includes
    recognizing each code similarity value between each of the plurality of open source software and the target software based on a third number of functions commonly included in the function included in the target source code and the function of the application code part of each of the plurality of open source software subjected to the code segmentation and a fourth number of functions of the application code part of each of the plurality of open source software subjected to the code segmentation, and extracting at least one second open source software in which the code similarity value is equal to or more than a predetermined value among the plurality of open source software subjected to the code segmentation.

6. The method of claim 5, wherein the code similarity value is determined based on a first equation,
the first equation is $$\Phi = \frac{|T \cap S|}{|S|},$$

and the φ represents the code similarity value, the T represents the function of the target software, and the S represents the function of the application code part of the plurality of open source software subjected to the code segmentation.

7. A device for identifying open source software components, the device comprising:
a processor configured to perform redundancy elimination for each of a plurality of open source software; and
a component database unit storing a result of performing the redundancy elimination,
wherein the processor is configured to identify a component of target software by using the component database unit,
wherein the processor
segments a source code included in each of the plurality of open source software into an application code part and a borrowed code part, wherein the application code part includes a code recognized as not prepared in another open source software and the borrowed code part includes code recognized as a code first prepared in another open source software, and
compares the target source code included in the target software and the application code part included in each of the plurality of open source software to extract at least one second open source software used when preparing the target software among the plurality of open source software, and
wherein the processor
recognizes one or more first functions which appear in a first source code included in third open source software among the plurality of open source software to be subjected to code segmentation,
selects fourth open source software among the plurality of open source software to be analyzed through a comparison with the third open source software,
recognizes one or more second functions which appear in a second source code included in the fourth open source software,
compares the one or more first functions and the one or more second functions and extracts one or more common functions recognized to be the same, recognizes one or more third functions which appear earlier in the fourth open source software among the one or more common functions, and removes the one or more third functions from a second dictionary data structure related to the third open source software in the component database unit.

8. The device of claim 7, wherein the processor
when performing the redundancy elimination for first open source software among the plurality of open source software, recognizes at least one function which appears in each of at least one version of the first open source software, and
sets a hash value of each of the at least one function as a key and sets at least one version in which each of the at least one function appears to a value for the key, and stores the key value in the component database unit as a first dictionary data structure for the first open source software.

9. The device of claim 8, wherein the first dictionary data structure is distinguished into different groups according to the number of versions in which the function appears.

10. The device of claim 7, wherein the processor removes the one or more third functions from the one or more first functions included in the second dictionary data structure when a value calculated based on a first number of the one or more second functions and a second number of the one or more third functions is equal to or more than a predetermined value.

11. The device of claim 7, wherein the processor
recognizes each code similarity value between each of the plurality of open source software and the target software based on a third number of functions commonly included in the function included in the target source code and the function of the application code part of each of the plurality of open source software subjected to the code segmentation and a fourth number of functions of the application code part of each of the plurality of open source software subjected to the code segmentation, and
extracts at least one second open source software in which the code similarity value is equal to or more than a predetermined value among the plurality of open source software subjected to the code segmentation.

12. The device of claim 11, wherein the code similarity value is determined based on a first equation,
the first equation is $$\Phi = \frac{|T \cap S|}{|S|},$$

and the φ represents the code similarity value, the T represents the function of the target software, and the S represents the function of the application code part of the plurality of open source software subjected to the code segmentation.

* * * * *